US008374404B2

(12) United States Patent
Williams et al.

(10) Patent No.: US 8,374,404 B2
(45) Date of Patent: Feb. 12, 2013

(54) IRIS RECOGNITION USING HYPER-SPECTRAL SIGNATURES

(75) Inventors: Darin S. Williams, Tucson, AZ (US); Kent P. Pflibsen, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1015 days.

(21) Appl. No.: 12/370,695

(22) Filed: Feb. 13, 2009

(65) Prior Publication Data

US 2010/0208951 A1 Aug. 19, 2010

(51) Int. Cl.
G06K 9/00 (2006.01)
G06K 9/46 (2006.01)

(52) U.S. Cl. ........ 382/117; 382/115; 382/159; 382/162; 382/191

(58) Field of Classification Search .............. 382/117, 382/115, 159, 162, 191
See application file for complete search history.

(56) References Cited

U.S. PATENT DOCUMENTS

| 4,641,349 | A | 2/1987 | Flom | |
|---|---|---|---|---|
| 5,291,560 | A | 3/1994 | Daugman | |
| 6,247,813 | B1* | 6/2001 | Kim et al. | 351/206 |
| 7,147,153 | B2* | 12/2006 | Rowe et al. | 235/382 |
| 7,593,550 | B2* | 9/2009 | Hamza | 382/117 |
| 7,652,685 | B2* | 1/2010 | Wach et al. | 348/78 |
| 7,693,307 | B2* | 4/2010 | Rieul et al. | 382/117 |
| 7,712,901 | B2* | 5/2010 | Wernick et al. | 351/221 |
| 7,809,171 | B2* | 10/2010 | Solinsky et al. | 382/117 |
| 2006/0222212 | A1* | 10/2006 | Du et al. | 382/115 |
| 2009/0245594 | A1* | 10/2009 | Abramovich et al. | 382/117 |
| 2009/0279790 | A1* | 11/2009 | Burge et al. | 382/209 |

OTHER PUBLICATIONS

Vilaseca, et al. "Characterization of the Human Iris Spectral Reflectance with a Multispectral Imaging System." Applied Optics. 47.30 (2008): 5622-5630. Print.*
Park, et al. "Multispectral Iris Authentication System against Counterfeit Attack using Gradient-based Image Fusion." Optical Engineering. 46.11 (2007): 1-14. Print.*
Ross, et al. "Information Fusion in Biometrics." Pattern Recognition Letters. 24. (2003): 2115-2125. Print.*
Proença, Hugo. "Iris Recognition: A Method to Segment Visible Wavelength Iris Images Acquired On-The-Move and At-A-Distance." Springer Lecture Notes in Computer Science—ISVC 2008: 4th International Symposium on Visual Computing. 1. (2008): 731-742. Print.*
Blum, et al. "Selection of Relevant Features and Examples in Machine Learning." Artificial Intelligence. 97. (1997): 245-271. Print.*
Monaco, Matthew. Color Space Analysis for Iris Recognition. MS thesis. West Virginia University, 2007. Morgantown: West Virginia University, 2007. Print.*
John Daugman, The importance of being random: statistical principles of iris recognition, Pattern Recognition 36 (2003) 279-291.
Boyce, C.K., "Multispecral iris recognition analysis: techniques and evaluation," 2006, West Virginia University, Morgantown, West Virginia.

(Continued)

Primary Examiner — Michael A Newman
(74) Attorney, Agent, or Firm — Eric A. Gifford

(57) ABSTRACT

The spectral diversity of the iris can be used as a unique biometric identifier. By careful selection of a number of spectral bands, four or more, the hyper-spectral signature derived from data contained in those bands can distinguish color signatures that are not visually distinguishable in RGB color space to uniquely identify a person. Classification of hyper-spectral signatures requires less spatial resolution than the classification of texture signatures, maybe an order of magnitude or more. This reduces the size of the sensor aperture required at a given range.

16 Claims, 8 Drawing Sheets

OTHER PUBLICATIONS

Park et al., "Iris recognition against counterfeit attack using gradient based fusion of multi-spectral images," Jan. 1, 2005, Advances in Biometric Person Authentication Lecture Notes in Computer Science; LNCS, Springer, Berlin, DE, pp. 150-156.

Park et al., "Multispectral iris authentication system against counterfeit attack using gradient-based image fusion," Optical Engineering, vol. 46, No. 11, Nov. 2007, pp. 117003-1 to 117003-14.

Du et al., "Using block-based spectral angle measure for iris patter matching," Proceedings of the International Society for Optical Engineering (SPIE), SPIE, USA, vol. 6497, Jan. 1, 2007, pp. 64970H1-64970H9.

Miyazawa et al., "An effective approach for iris recognition using phase-based image matching," IEEE Transactions on Pattern Analysis and Machine Intelligence, IEEE Service Center, Los Alamitos, CA, vol. 30, No. 10, Oct. 1, 2008, pp. 1741-1756.

Zhang et al., "Automated biometric passage," Jan. 1, 2000, Automated Biometrics: Technologies and Systems, Norwell, MA, Kluwer Academic Publishing, US, pp. 170-175.

Lee et al., "Iris recognition using local texture analysis," Optical Engineering, vol. 47, No. 6, Jun. 2008, pp. 067201-1 to 067205-10.

Vilaseca et al., "Characterization of the human iris spectral reflectance with a multispectral imaging system" Applied Optics, Optical Society of America, vol. 47., No. 30, Oct. 20, 2008, pp. 5622-5630.

* cited by examiner

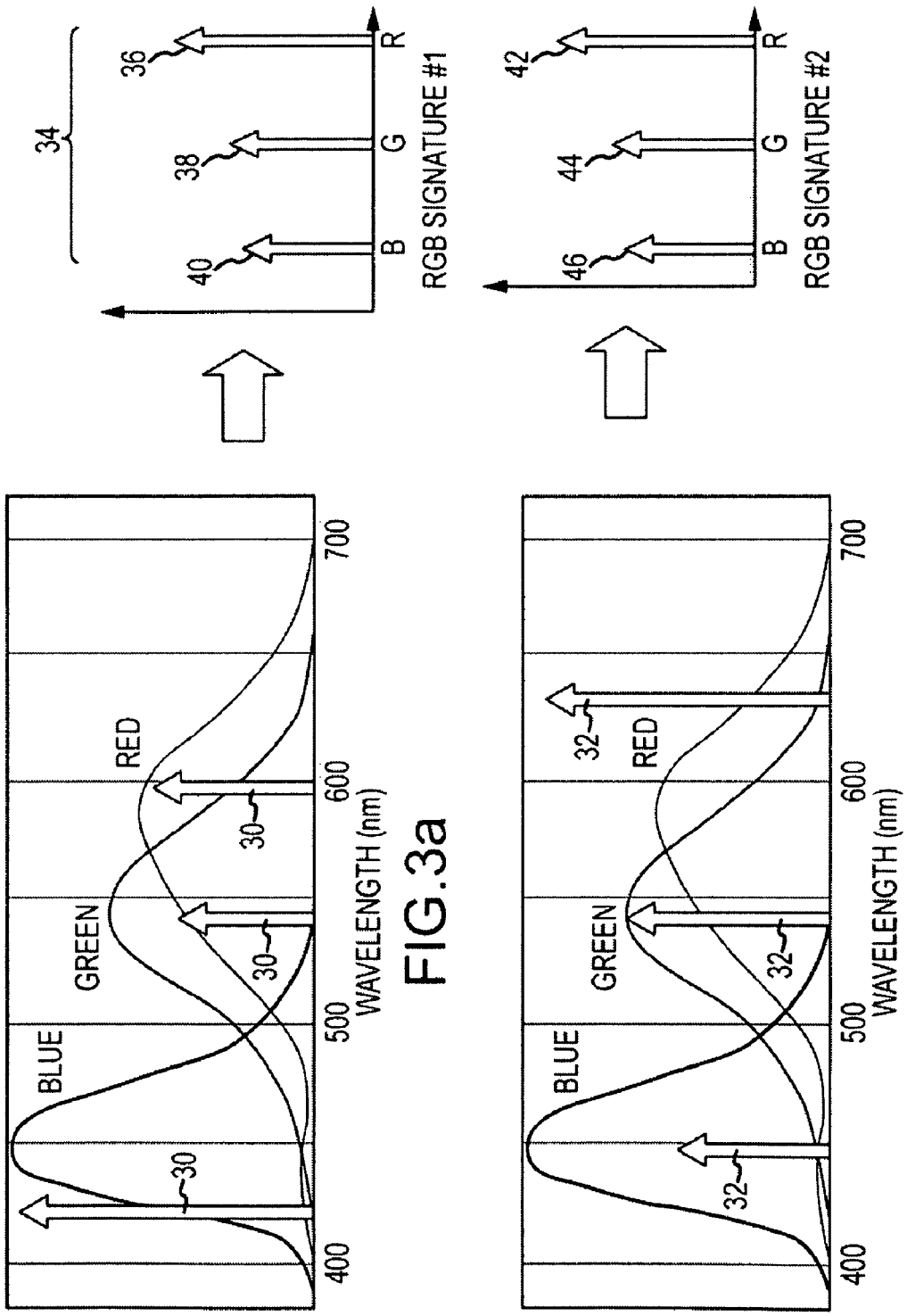

IRIS RECOGNITION USING HYPER-SPECTRAL SIGNATURES

BACKGROUND OF THE INVENTION

1. Field of the Invention

This invention relates to biometric identification through iris recognition, and more specifically to the use of hyper-spectral signatures to distinguish color signatures that are not visually distinguishable in RGB color space.

2. Description of the Related Art

The use of biometric indicia for identification purposes requires that a particular biometric factor be unique for each individual, that it be readily measured, and that it be invariant over time. Although many indicia have been proposed over the years, fingerprints are perhaps the most familiar example of a successful biometric identification scheme. As is well known, no two fingerprints are the same, and they do not change except through injury or surgery. It is equally clear, however, that identification through fingerprints suffers from the significant drawback of requiring physical contact with the person. No method exists for obtaining a fingerprint from a distance.

A biometric indicator that has gained popularity in the last decade is the iris. The iris of every human eye has unique texture features of high complexity, which prove to be essentially immutable over a person's life. No two irises are identical in texture or detail, even in the same person. The spatial diversity of the iris reflected in the texture features can be used as a unique biometric indicator. As an internal organ of the eye the iris is well protected from the external environment, yet it is easily visible even from yards away as a colored disk, behind the clear protective window of the eye's cornea, surrounded by the white tissue ("sclera") of the eye. Although the iris stretches and contracts to adjust the size of the pupil in response to light, its detailed texture remains largely unaltered apart from stretching and shrinking. Such distortions in the texture can readily be reversed mathematically in analyzing an iris image, to extract and encode an iris signature that remains the same over a wide range of pupillary dilations. The richness, uniqueness, and immutability of iris texture, as well as its external visibility, make the iris suitable for automated and highly reliable personal identification. The registration and identification of the iris can be performed using a video camera without any physical contact, automatically and unobtrusively.

The first attempt to take advantage of these favorable characteristics of the iris for a personal identification system is seen in U.S. Pat. No. 4,641,349 issued to Flom and Safir and entitled "Iris Recognition System." It has been discovered that every iris is unique, particularly in the detailed structure of the front or anterior layer. Flom extracted a number of structural features including pigment-related features such as frill, collarette, concentric furrow, radial furrow, crypt, pigment spot, atrophic area, tumor, contenital filament etc. and compared these to features stored for identified persons. At col 13, lines 41 to 45, the color could be found by an algorithm obtaining a histogram in three-dimensional RGB color space. The peak in the histogram will provide a descriptor of color.

U.S. Pat. No. 5,291,560 issued to Daugman and entitled "Biometric personal identification system based on iris analysis", which is hereby incorporated by reference, extended the general concept of iris recognition to a complete and automated system. Image analysis algorithms find the iris in a live video image of a person's face, and encode its texture into a compact signature, or "iris code." Iris texture is extracted from the monochrome image at multiple scales of analysis by a self-similar set of quadrature (2-D Gabor) bandpass filters defined in a dimensionless polar coordinate system. The original iris image may consist of a 512×512 array of pixels. The sign of the projection of many different parts of the iris onto these multi-scale quadrature filters, determines each bit in an abstract (256-byte) iris code. The degrees-of-freedom in this code are based on the principle forms of variation in a population of irises studied. Because of the universal mathematical format and constant length of the iris codes, comparisons between them are readily implemented by the Exclusive-OR (XOR) logical operation. Pattern recognition is achieved by combining special signal processing methods with statistical decision theory, leading to a statistical test of independence based on a similarity metric (the Hamming distance) that is computed from the XOR of any two iris codes. This measure positively establishes, confirms, or disconfirms, the identity of any individual. It also generates an objective confidence level associated with any such identification decision.

Iris recognition systems in use today are based on Daugman's texture analysis. The earliest systems require the person to put their face up to a scanner. More recent systems use a wall mounted scanner that require the user to simply look up. Customers would like to field systems that can perform iris recognition at ranges beyond 25 meters and perhaps beyond 100 meters. However, at these ranges the sensor resolution and aperture sizes required to provide the spatial resolution for texture analysis are impractical. Texture analysis is diffraction limited, which requires large apertures, and even using arbitrarily large apertures is reaching the limits imposed by Earth atmosphere.

SUMMARY OF THE INVENTION

The present invention provides an alternate approach for iris recognition.

This is accomplished by exploiting the spectral diversity of the iris by sensing a hyper-spectral signature of a portion of the iris and matching it to a reference hyper-spectral signature to identify the person. Iris "color" may be a function of the pigments that are present in the iris, the concentrations, locations and micro structure of the pigments and the gross and micro structure of the iris. Because of the natural response of the human eye, many different permutations of these parameters may appear as the same color and thus are not visually distinguishable in RGB color space. Therefore, RGB "color" may provide a useful descriptor but cannot uniquely recognize a person's iris. However, these same permutations will have different and unique hyper-spectral signatures. By careful selection of a number of spectral bands, four or more, the hyper-spectral signature derived from data contained in those bands can distinguish color signatures that are not visually distinguishable in RGB color space to uniquely identify a person. Together these bands may span the RGB color space and possibly a portion of the ultra-violet (UV) or near infrared (NIR) bands as well. Classification of hyper-spectral signatures requires less spatial resolution than the classification of texture signatures, maybe an order of magnitude or more. This reduces the size of the aperture at a given range. A system may combine classic texture analysis (spatial diversity) with hyper-spectral signatures (spectral diversity) for more robust performance.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 3a and 3b are plots of two different stimuli that are visually indistinguishable in RGB color space;

DETAILED DESCRIPTION OF THE INVENTION

The present invention describes a unique biometric identifier based on the spectral diversity of the iris. By careful selection of a number of spectral bands, four or more, the hyper-spectral signature derived from data contained in those bands can distinguish color signatures that are not visually distinguishable in RGB color space to uniquely identify a person. Classification of hyper-spectral signatures requires less spatial resolution than the classification of texture signatures, maybe an order of magnitude or more. This reduces the size of the aperture at a given range.

Figure 1:
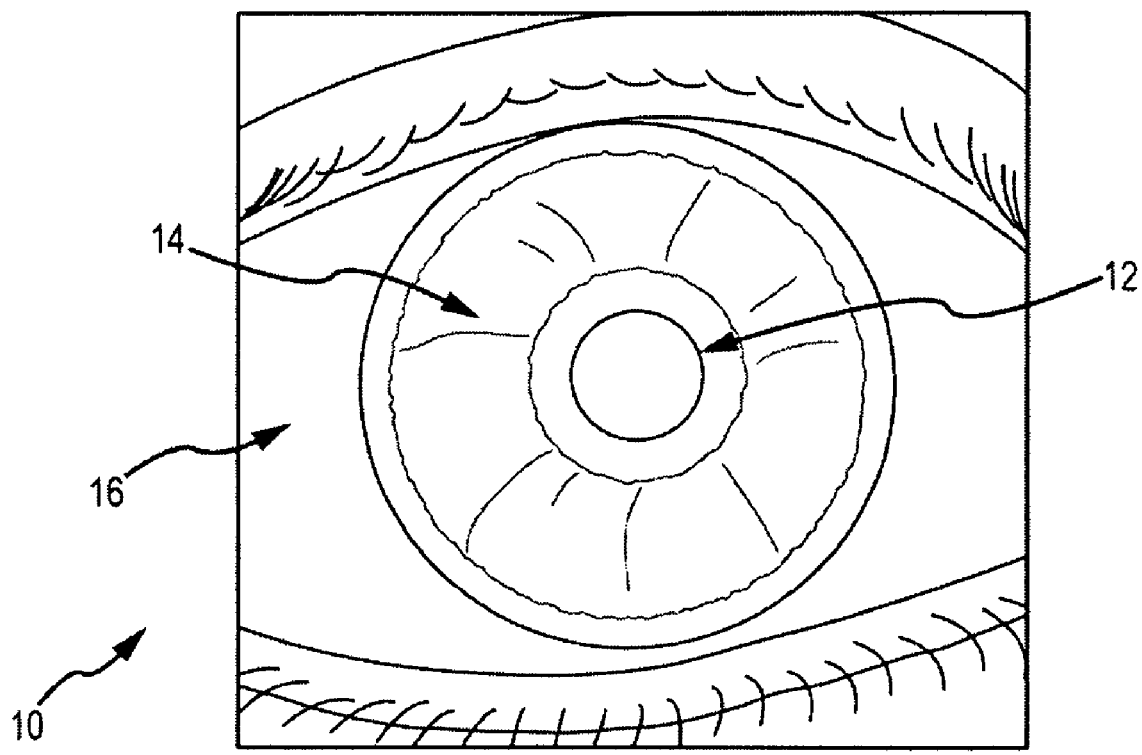
FIG. 1 is a diagram of the human eye and the iris.

FIG. 1 is a simplified drawing of a human eye 10 showing in detail the features of the pupil 12, iris 14 and sclera 16. Pupil 12 is a sphere located in the center of the iris that controls the amount of light that enters the eye. The pupil appears black because most of the light entering the pupil is absorbed by tissue inside the eye. Iris 14 consists of pigmented librovascular tissue known as a stroma. The iris is the most forward portion of the eye and the only one seen on superficial inspection. The stroma connects a sphincter muscle, which contracts the pupil, and a set of dilator muscles which open it. The iris is usually strongly pigmented with colors ranging from brown to green, blue, grey and hazel. The iris "color" may be a function of the pigments that are present in the iris, the concentrations, locations and micro structure of the pigments and the gross and micro structure of the iris. The precise mechanisms that determine color are not yet fully understood or agreed upon. Sclera 16 known as the 'white or the eye' surrounds the iris.

In optical terms, the pupil is the eye's aperture and the iris is the aperture stop. These optics create an image of the visual world on the retina, which serves much the same function as the film in a camera. The retina is a complex, layered structure with several layers of neurons interconnected by synapses. The only neurons that are directly sensitive to light are the photoreceptor cells including the rods, which are responsible for low-light black-and-white vision and cones, which are responsible for color vision.

Figure 2:
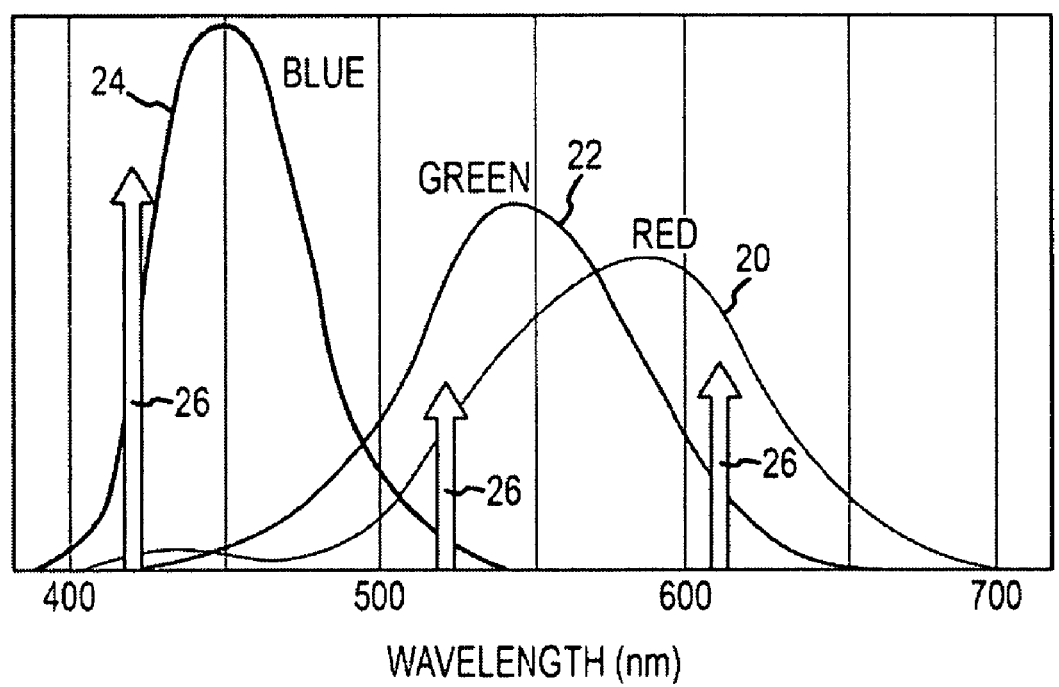
FIG. 2 is a diagram illustrating the spectral response of the human eye to stimuli.

As shown in FIG. 2, there are three types of cones, maximally sensitive to long-wavelength, medium-wavelength, and short-wavelength light (often referred to as red 20, green 22, and blue 24, respectively though the sensitivity peaks are not actually at these colors). The RGB color space spans approximately 400 nm-700 nm. The red response is centered at approximately 590 nm and is very broad, spanning most of the RGB spectrum. The green response is centered at approximately 545 nm and is a little narrower. The blue response is centered at approximately 450 nm and is the narrowest. The color seen is the combined effect of stimuli 26 to and responses from, these three types of cone cells. Color video cameras are typically configured to closely mimic the response of the human eye in RGB color space.

As shown in FIGS. 3a and 3b, different stimuli 30 and 32 (different wavelengths and/or different amplitudes) may produce the same color 34 as seen by a person in RGB color space or at least indistinguishable by the human eye or RGB sensor. More specifically, the integrated red, green and blue responses 36, 38 and 40 to stimuli 30 are the same component-by-component as the integrated red, green and blue responses 42, 44 and 46 to stimuli 32. Consequently, the integrated color perceived by the human eye and color signatures in RGB color space are the same and thus cannot be used to uniquely identify the stimuli, either as a single integrated color or as R, G, B color components.

The different combinations of pigments present in the iris, the concentrations, locations and micro structure of the pigments and the gross and micro structure of the iris may produce unique stimuli that span the RGB color space from 400 nm to 700 nm and possibly portions of the UV band (100-400 nm) or the NIR band (700-1,000 nm). However, the number and gradation of RGB colors that are perceivable by the human eye is limited. Thus, although different irises produce unique stimuli they may produce the same RGB color response. As Flom recognized, the RGB color may be used as a feature or indicator of a person, but not a unique identifier. Daugman uses monochrome images for his texture analysis.

Instead of ignoring color altogether as Daugman does or simply using RGB color as an indicator, we propose that with careful selection of a number of spectral bands, four or more, the hyper-spectral signature derived from data contained in those bands can distinguish color signatures that are not visually distinguishable in RGB color space to uniquely identify an iris, hence a person.

Figure 4A:
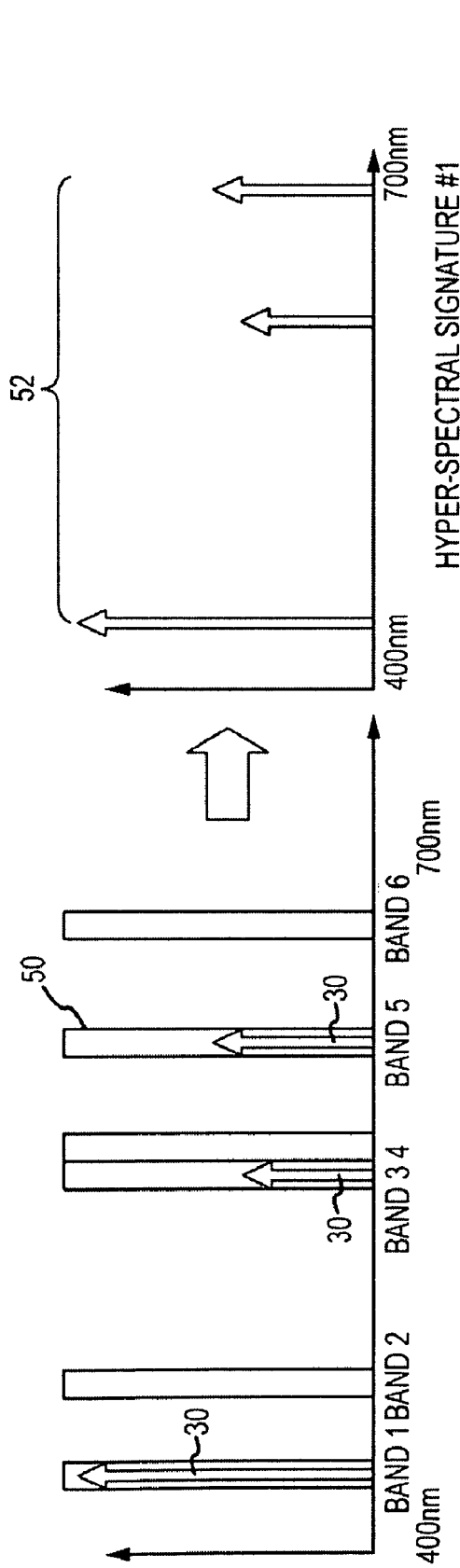
FIGS. 4a and 4b are plots of the same two stimuli that are uniquely identifiable as hyper-spectral signatures.
Figure 4B:
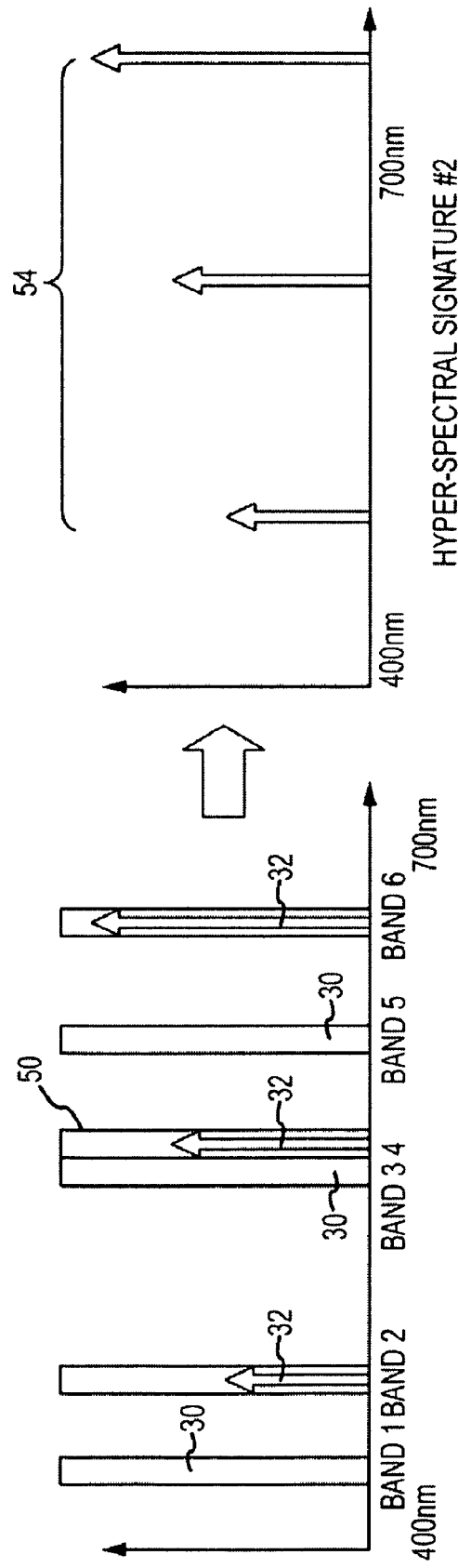

Referring now to FIGS. 4a and 4b, using the example stimuli 30 and 32 above (that produced the same RGB color), we provide a hyper-spectral sensor that acquires data in a plurality of bands that span the visible band. The data contained in 6 bands 50 (Band 1 through Band 6) preserve the hyper-spectral signatures 52 and 54 of the different stimuli. A classifier can extract data from these bands to match the measure hyper-spectral signatures to reference hyper-spectral signatures stored in a database. These stimuli and bands are selected merely to illustrate the concept of extracting and processing a hyper-spectral signature to uniquely identify the hyper-spectral signature of the iris, hence the person.

In an iris recognition system, the number, position and width of the bands will depend on several factors. The robustness of the stimuli or hyper-spectral signature associated with the iris will affect which bands and how many are needed to uniquely discriminate different iris signatures. The spectral resolution of the sensor will establish the minimum width of an individual band. The aperture size, sensor angular resolution and range to target will impact both the spatial resolution and the number of phonons incident on the sensor. Bands with low phonon incidence may need to be merged (widened) to improve the signal-to-noise ratio (SNR). There is a trade-off between having narrower bands to improve discrimination and wider bands to improve SNR of a given band. The selection of bands will also depend on the sophistication of the features extraction process and the classifier as well as the acceptable false alarm rate. All detection systems, including finger print systems, tradeoff detection accuracy versus false alarm rate. Features may be extracted from individual bands (e.g. amplitude, energy, etc.) or between bands (e.g. difference or ratio of amplitudes or energy). The classifier may be constructed and trained for the general populace and then used to identify persons in a specific database or the classifier may be constructed or trained based on the people in the specific database. The former is generally more robust but the later may provide better performance for the specific persons of interest. The classifier itself may be any classifier used to compare a measured pattern to a database of known patterns to determine a match. For example, classifiers may be selected from a linear discriminate analysis classifier (LDA), relevance vector machine (RVM), neural network classifier or Bayesian classifier. The data extracted from the bands to form the hyper-spectral signature could be assigned an iris code and, much like in Daugman, the reference signature in the database having the smallest Hamming distance matched to the measured signature. The hyper-spectral classifier may be combined with Flom's or Daugman's texture classifier, the combination of both spatial and spectral diversity should improve classification performance.

The enabling aspect of the hyper-spectral sense and classification system was to recognize that previous teachings against the use of color (e.g. Daugman's monochrome texture analysis) or the limited use of color (e.g. Flom's use of the RGB color as an indicator to supplement texture analysis) did not appreciate the spectral diversity of the iris. While many different irises may look they same to the eye in RGB space, those irises have different hyper-spectral signatures. By gathering iris data with a hyper-spectral sensor we can preserve these immutable characteristics and uniquely identify the iris based only on spectral data. The acquisition and processing does not require the high spatial resolution of textural feature processing. Spatial resolution requirements (aperture size) limitations may be reduced by a factor of ten, enabling further sensing ranges and smaller more covert sensors.

FIGS. 5, 6a-6c and 7a-7c illustrate an embodiment for constructing and training a classifier for processing data contained in hyper-spectral bands to match the measured hyper-spectral signature of an iris of an unidentified person to a reference hyper-spectral signature for an identified person.

Figure 6A:
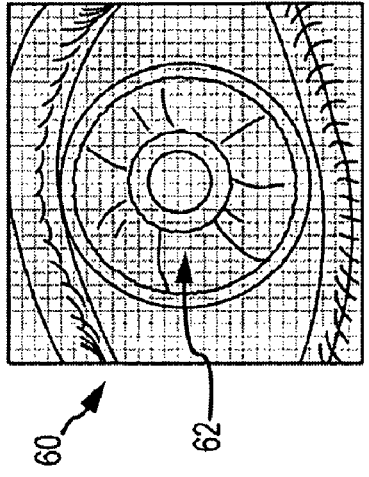
FIGS. 6a through 6c are diagrams illustrating the acquisition of the pixilated image of the eye, isolation of the iris and selection of specific portions of the iris.
Figure 6B:
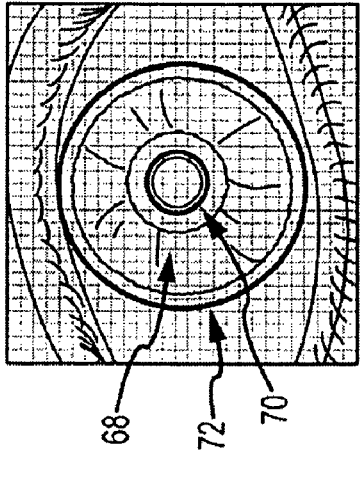
Figure 6C:
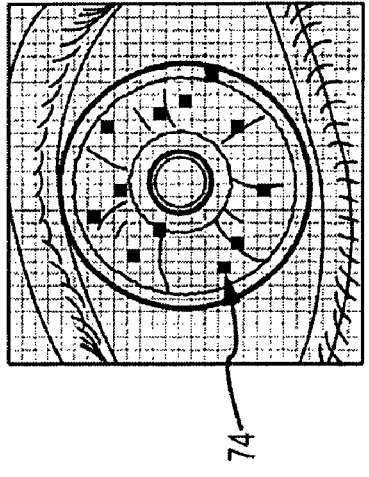
Figure 5:
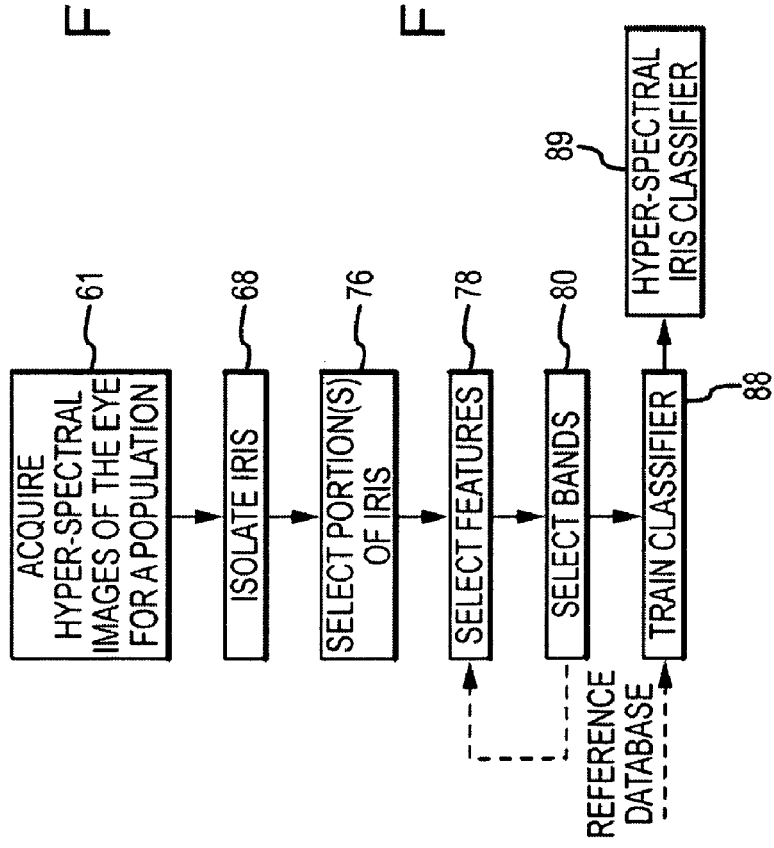
FIG. 5 is a flow diagram for constructing and training a hyper-spectral classifier.
Figure 7A:
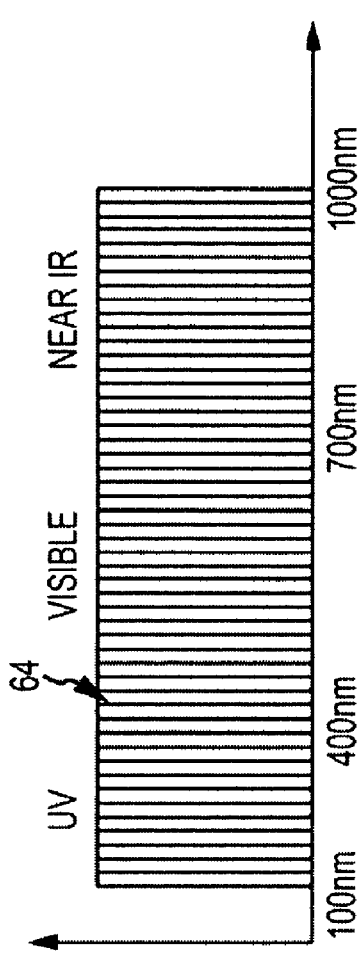
FIGS. 7a through 7c are diagrams illustrating the selection of specific hyper-spectral bands.
Figure 7B:
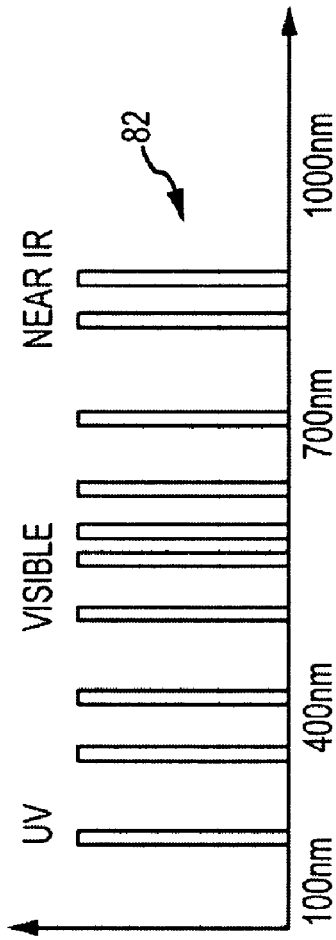
Figure 7C:
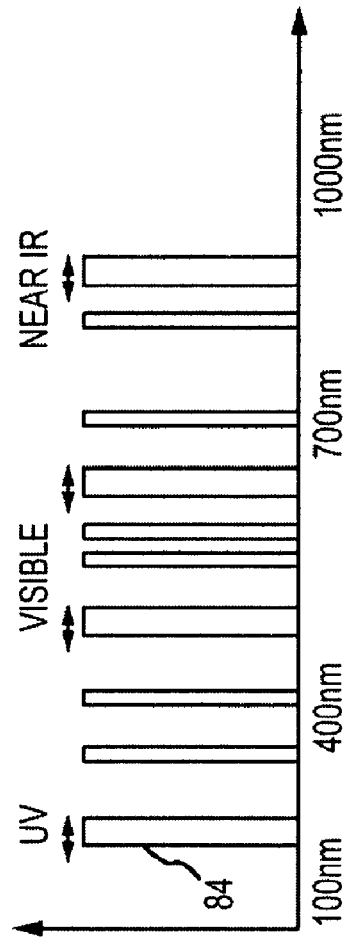
Figure 8:
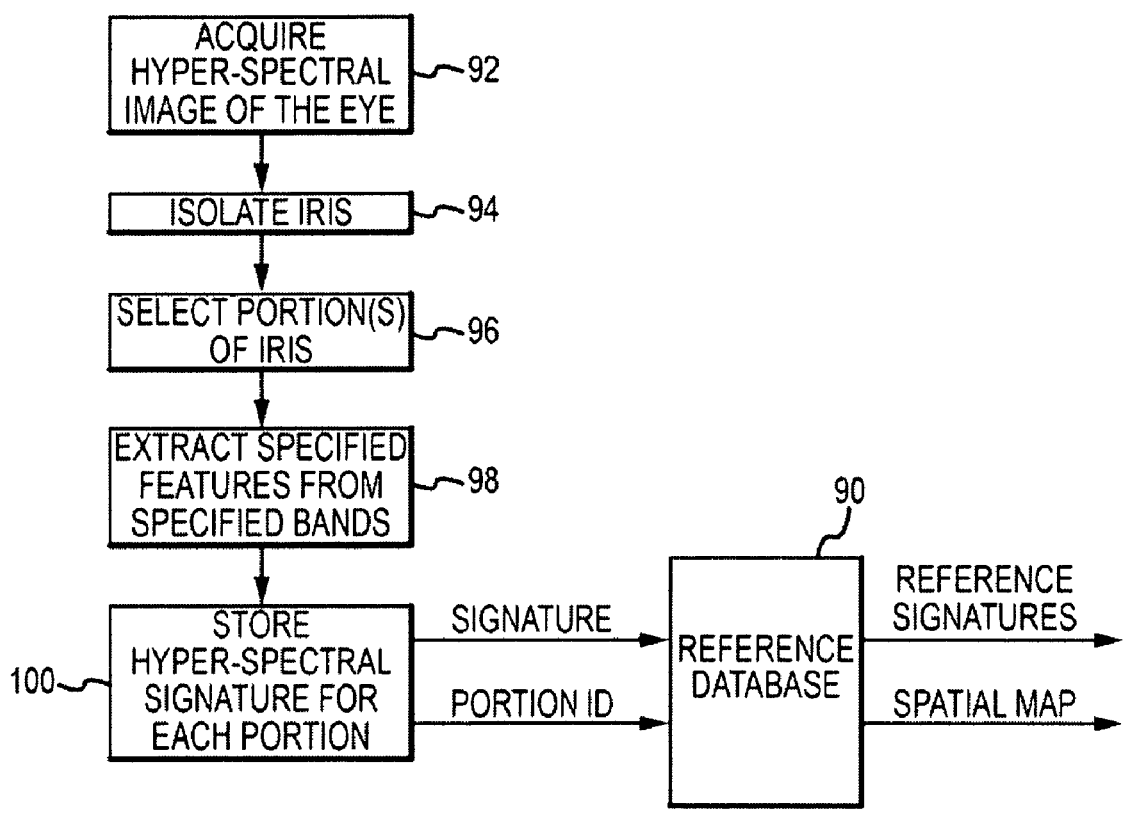
FIG. 8 is a flow diagram for constructing a reference library of hyper-spectral signatures for identified persons.

Hyper-spectral images 60 of the eyes of a number of people are acquired to provide a robust and diverse data set (step 61). Data may be gathered from the general population of all persons, from a specific population such as Caucasians, or from a population only including the identified persons of interest. As shown in FIG. 6a, each image 60 is pixilated at a certain spatial resolution to define spatial pixels 62. In general, the spatial resolution required to obtain the same classification performance using hyper-spectral signatures is significantly less than using texture signatures, perhaps a factor of ten or greater. As shown in FIG. 7a, the one or more hyper-spectral sensors separate the spectrum of each image 60 into a plurality of bands 64. The bands may be contiguous, overlapping or discrete. The bands may span the entire visible (RGB) band from 400-700 nm and a portion of either the UV band (100-400 nm) or the Near IR band (700-1,000 nm). The number and width of bands will depend on the selection of the sensor. A system may have one sensor to sense data in the visible band and another to sense data in a portion of the UV or NIR band or a single sensor to sense data across all desired bands.

The next step is to isolate the iris 66 in the spatial image 60 (step 68). Concentric circles 70 and 72 are drawn around the pupil and the iris, respectively, to isolate the iris. These techniques are well known in the industry. One technique is described in Daugman's U.S. Pat. No. 5,291,560.

Once the iris is isolated, one or more portions 74 of the iris are selected (step 76). A "portion" may be any arbitrary pixel, a specified pixel or group of pixels or a group of all pixels that cover the iris. How a "portion" is selected in a particular application may, for example, depend on the uniformity or robustness of the hyper-spectral signature spatially across the eye and the system's ability to register a measured portion to the same portion stored in the database. If the signature is either very robust or uniform, the system may be configured to either compare the signature for 'any' measured iris pixel against the reference signature for any other iris pixel or compare signatures for all the pixels. If the system can register measured pixels to reference pixels with sufficient accuracy, the classifier can compare the signature for a particular pixel (group of pixels) to the reference signature for the same pixel (group of pixels). If multiple portions are examined, registration can be preformed by either knowing the absolute position of each portion or specifying a spatial pattern of the portions and correlating the pattern to measured data. The classifier can perform the classification for multiple different portions individually and fuse the results to improve performance.

Pattern recognition is often based on derived features from the original signal rather than based on the original signal itself. Extraction and processing of derived features can be simpler and more robust than raw data. In the hyper-spectral classifier, the task is to identify a limited number of both features (step 78) and bands (step 80) that maximize class separation where the classes are the different hyper-spectral signatures for the different irises. The possible bands are all of the bands sensed by the one or more sensors as shown in FIG. 7a. The possible features may be defined by the designer of the classifier based on knowledge of the problem. In this application, the features may include inter band features such as the maximum amplitude or energy within each band or may include intra band features such as the difference, ratio or sum of the amplitude or energy between a band and another band. Feature extraction may also include measurement of the hyper-spectral signature of the sclera to compute or calibrate other features to remove the effects of illumination and differences in the effective path transmission between bands. The classifier could be configured to compute every feature for every band but this would be computationally inefficient and perhaps not as robust. Training of the classifier would itself tend to emphasize important bands and features and de-emphasize less important bands and features. One way to select features and bands would be to train the classifier in this manner and then remove the features and bands that were deemphasized.

In this embodiment, for a given population of iris data, a feature selection process (step 78) is performed to select a subset of d features that are the most appropriate from all of the bands 64 for which data is acquired by the one or more hyper-spectral sensors. In general, the process selects the features that maximize class separability (differentiate one hyper-spectral signature from another) over all training data. The process typically either specifies the number of features in the subset and then picks the best features or specifies a performance criteria and picks the best and fewest features required to satisfy the criteria. The benefits of the feature selection procedure are two-fold: it could reduce the computational cost of classification by reducing the number of features that need to be calculated, and it could improve classification accuracy by fitting a simpler model based on a finite number of training samples.

Once the subset of d features are selected, a similar band selection process (step 80) is performed to select a subset of f bands 82 (Band 1, Band 2, etc.) that are the most appropriate from all of the bands 64 for which data is acquired by the one or more hyper-spectral sensors. In general, the process selects the bands that maximize class separability (differentiate one hyper-spectral signature from another) over all training data. The process typically either specifies the number of bands in the subset and then picks the best bands or specifies a performance criteria and picks the best and fewest features required to satisfy the criteria. The composition of the bands may span the visible (RGB) spectrum by which we mean at least one band 82 is selected corresponding to each of the R, G and B responses shown in FIG. 2. The composition may also include one or more bands 82 from the near IR or UV bands. The total number of bands 82 will be 4 or more. The number of bands may be 6 or greater, 10 or greater or 10 to 25 depending on many factors. The selection process may also allow or require the width of certain bands 84 to be increased (i.e. by merging adjacent bands) to improve the SNR. Optionally, step 78 of selecting the features can be repeated for the selected bands.

By way of example, one process of feature (band) selection is sequential forward floating selection (SFFS). Given the candidate features (bands) described in previous section, a subset of d features (f bands) is selected that performs the best under the selected classifier (e.g. a linear discriminator analysis (LDA) classifier). SFFS starts from an empty subset and sequentially selects the one most significant feature (band) at a time and adds it to the subset to maximize a cost function until a predefined number is obtained (or a predefined cost function obtained). The classification error over a training set is used as the cost function. Sequential backward selection (SBS) is another selection process that's starts from a subset with all features (bands) and selectively deletes one least significant feature (band) at a time until a predefined number is obtained. Both SFS and SBS methods have the so-called nesting problem: once a feature (band) is added/deleted, it cannot be deleted/added anymore. The SFFS method avoids the nesting problem by correcting earlier 'mistakes' by backtracking: first enlarge the subset by adding l most significant features (bands) using SFFS, then delete r least significant features (bands) using SBS. The l and r are determined dynamically ("floating") so as to approximate the optimal solution.

Once the subset of features and bands has been selected for a specified classifier, the hyper-spectral iris classifier 89 must be trained (step 88) until the presented features from the training data match the response patterns for the reference data to uniquely match the measured hyper-spectral signature of an unidentified person to the reference hyper-spectral signature of an identified person. As with the construction of the classifier, the training of the classifier may be performed on the general population, a specific sub-population or the identified persons in the database. What data is used will depend on a tradeoff of overall classifier robustness versus accuracy for the current set of identified persons. If the classifier is trained on a general population it should accommodate the addition of signatures for identified persons to the database more readily. What data is used may also depend on the type of classifier, some classifiers may require the reference hyper-spectral signatures ("patterns") be used.

In either case, the specified subset of features is extracted from data in the specified subset of bands and applied to the classifier, which compares the features to those features stored in the classifier and selects the closest match or matches. Features for signatures not stored in the classifier may also be presented in which case the classifier should indicate "no match". The training process is typically supervised so that positive feedback is provided when the classifier selects the correct signature and negative feedback is provided when the classifier is mistaken. The classifier is suitably trained on a large amount of data, which can be repeated, until the classifier stabilizes.

In many cases, the classifier includes weights that weight the various features and combine them to classify the input pattern. In these cases, training adjusts the weights until the classifier accurately matches the test patterns (hyper-spectral signatures) to the stored patterns. In other classifiers, such as one based on computing the Hamming distance between the raw hyper-spectral signature or the extracted features and the stored signature or features no training may be required. The classifier can be any classifier that is capable of pattern matching, i.e. matching the pattern of the raw hyper-spectral signature or more likely of extracted features from a subset of bands to a reference signature or features.

Once the classifier is constructed and trained, the hyper-spectral signatures (or features representative of the signatures) for identified persons must be stored in a reference database. For each person to be identified and stored in the reference database 90, a hyper-spectral image of the person's eye is acquired (step 92), either overtly or covertly. The image is processed spatially to isolate the iris (step 94) and select one or more portions of the iris (step 96). It is possible that the hyper-spectral signatures are at least partly genetic and could be at least partially predicted from a DNA sample. For each portion, the specified features are extracted from data contained in the specified bands (step 98) and the hyper-spectral signature and the portion identifier are stored (step 100) in reference database 90. The reference database so configured stores the reference hyper-spectral signatures for a population of identifier persons.

Figure 9:
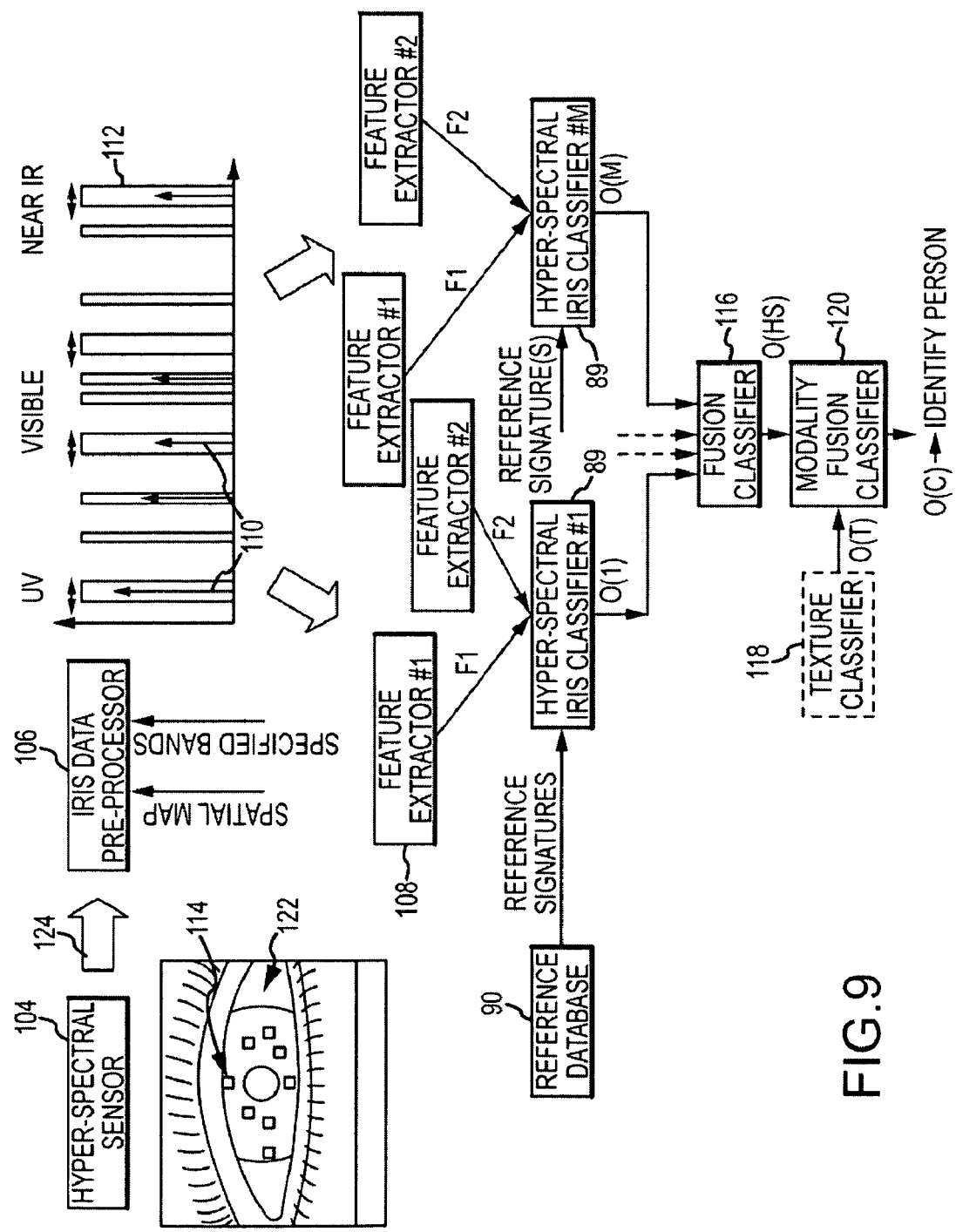
FIG. 9 is a diagram of an iris detection system using hyper-spectral signatures.

Referring now to FIG. 9, in an embodiment one or more hyper-spectral sensors 104, an iris data pre-processor 106, one or more feature extractors 108, one or more of the hyper-spectral iris classifiers 89, and reference database 90 are configured to sense a hyper-spectral signature of the iris of an unidentified person from data 110 contained in four or more bands 112 and compare the sensed hyper-spectral signature to the reference hyper-spectral signature to identify the unidentified person. As shown, classification is performed for multiple portions 114 of the iris. A fusion classifier 116 processes the outputs of the individual classifiers to fuse the results and generate a hyper-spectral classification output. As also shown, a texture classifier 118, suitably of the type described by Daugman or Flom, extracts texture features from the image of the iris and generates a texture classification output. A modality fusion classifier 120 processes both the hyper-spectral and texture outputs to identify the unknown person as one of the persons stored in the reference database or to indicate no match.

The one or more hyper-spectral sensors 104 image an unidentified person's eye 122. The iris data pre-processor 106 processes the pixilated hyper-spectral image data 124 to isolate the iris and extract the portion(s) of pixilated image data 110 in the specified bands 112. If required, a spatial map of the one or more portions of image data is provided to the pre-processor. If the classifier is configured to either process any portion or all of the iris the map is not required. Similarly if a subset of the bands generated by tile sensor, as would be typical, are specified, the specified bands are provided to the pre-processor.

For each spatial portion 114, one or more feature extractors 108 extract features from data 110 contained in the four or more bands 112. The extracted features are then presented to the respective hyper-spectral iris classifier 89. It is expected that the same features will be extracted from the same bands and input to the same classifiers for the different portions. However, training may reveal enough variance in the hyper-spectral signatures across the spatial extent of the iris that the selected features or bands are different.

The iris classifiers generate outputs O(1), O(2) . . . O(M) for each of the M portions. The classifier may be configured to generate outputs in different ways. The output maybe a likelihood (continuous 0 to 1) or decision (binary 0 or 1) for one or more possible matches. For example, the classifier may output the best match with a likelihood value or the decision 1 with the high classification confidence. Alternately, the classifier may output the n best matches with their likelihood values or classification confidences.

For a system that evaluates a single portion of the iris, the output O(1) constitutes the final output. Again, the output O(1) may simply identify the closest "match" the reference signatures, may identify the closest "match" with the likelihood or confidence that the match is correct or may identify a number of the closest "matches". The form of the output will be dictated by how the output is used. For example, other information may be available to exclude or reinforce certain matches. Alternately, multiple matches may be used to identify a limited number of persons of interest.

For a system that evaluates multiple portions of the iris, the M outputs O(1), O(2) . . . O(M) are presented to fusion classifier 116 that fuses the outputs of the M classifiers, likelihood or decision, to generate a single hyper-spectral output O(HS), typically a decision output with a classification confidence. Feature-level fusion detects a spatial pattern using a global classifier. The continuous valued likelihood outputs of the iris classifiers are considered as input features. The fusion classifier is trained to recognize certain spatial patterns. Decision-level fusion detects spatial patterns by optimizing complementarities of the iris classifiers' binary decisions. Decision-level fusion is implemented to achieve an optimal combination of maximum likelihood estimates achievable between two or more alternative and complementary decisions. Training provides the operating points for the decision-level classifier. An effective approach is to use Bayesian inference where spatial classifiers' binary decisions are treated as multiple hypotheses that need to be combined optimally. The fusion of multiple outputs should increase the confidence of a correct match. Again, O(HS) may identify the person with a decision output 1 with the high classification confidence or multiple persons with a decision output 1 with the highest classification confidences.

Although the extracted hyper-spectral signature should be sufficient to uniquely identify an iris, it may be desirable in certain systems it may be useful to combine the spectral diversity of the hyper-spectral classification with the spatial diversity of a texture classifier 118. Texture classifier 118 processes the monochrome iris image data to extract texture features and generate a decision level output(s) O(T) specifying the best match or matches. The decision level outputs O(HS) and O(T) are then presented to a decision-level modality fusion classifier 120. Again, the output O(C) of this classifier may be the single best match or a number of the best matches.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A system of iris recognition, comprising:
storage configured to store reference hyper-spectral signatures for different portions of the iris of a person's eye for each of a plurality of identified persons, each said portion comprising one or more spatial pixels at a certain spatial resolution, each said reference hyper-spectral signature defined by features extracted from data contained in four or more bands within the RGB color space from approximately 400 nm to 700 nm, said reference hyper-spectral signatures for the different portions of the iris combining spectral diversity of the four or more bands and spatial diversity of said portions at the certain spatial resolution to distinguish color signatures that are not visually distinguishable by the human eye;
a hyper-spectral sensor configured to sense data through an aperture at the certain spatial resolution from at least said four or more bands for the different portions of the iris in response to stimuli from an unidentified person's iris at a given range, the size of said aperture being at least ten times smaller than and providing at least ten times less certain spatial resolution than a near-infrared (NIR) sensor configured to produce a monochrome texture signature to identify the unidentified person at the same range; and
a classifier configured to extract features from the data contained in the four or more bands in the different portions of the iris to produce sensed hyper-spectral signatures of the different portions of the iris at the certain spatial resolution of the unidentified person and compare the sensed hyper-spectral signature to the reference hyper-spectral signature for the same portion of the iris for the plurality of different portions to generate an output that identifies the unidentified person.

2. The system of claim 1, wherein both the reference and sensed hyper-spectral signatures includes six or more bands within the RGB color space from approximately 400 nm to 700 nm 3. The system of claim 1, wherein the four or more bands are non-contiguous.

4. The system of claim 1, wherein the four or more bands include at least one band in each of the R, G and B bands.

5. The system of claim 1, the hyper-spectral signatures further comprising at least one band in one of the UV and NIR bands.

6. The system of claim 1, wherein the classifier generates an output for each said portion, further comprising a fusion classifier that fuses the outputs to identify the unidentified person.

7. The system of claim 1, further comprising a training pre-processor that uses hyper-spectral signatures for a plurality of people as a training set to down select the four or more bands from a larger plurality of candidate bands within the RGB color space from approximately 400 nm to 700 nm to distinguish the hyper-spectral signatures in the training set.

8. The system of claim 1, wherein the sensor measures a signature of the sclera of the unidentified person's eye as a calibration reference.

9. The system of claim 1, wherein measurement of the hyper-spectral signature is the only basis for iris recognition of the unidentified person.

10. The system of claim 1, wherein the classifier processes hyper-spectral signatures sensed at said given range in excess of 25 m to identify the unidentified person.

11. A method of iris recognition, comprising:

storing reference hyper-spectral signatures for different portions of the iris of a person's eye for each of a plurality of identified persons, each said portion comprising one or more spatial pixels at a certain spatial resolution, each said reference hyper-spectral signature defined by features extracted from data contained in four or more bands within the RGB color space from approximately 400 nm to 700 nm, said reference hyper-spectral signatures for the different portions of the iris combining spectral diversity of the four or more bands and spatial diversity of said portions at the certain spatial resolution to distinguish color signatures that are not visually distinguishable by the human eye;

sensing data with a hyper-spectral sensor through an aperture at the certain spatial resolution from at least said four or more bands for the different portions of the iris in response to stimuli from an unidentified person's iris at a given range, the size of said aperture being at least ten times smaller than and providing at least ten times less certain spatial resolution than a near-infrared (NIR) sensor configured to produce a monochrome texture signature to identify the unidentified person at the same range; and extracting features from the data contained in the four or more bands in the different portions of the iris to produce sensed hyper-spectral signatures of the different portions of the iris at the certain spatial resolution of the unidentified person and comparing the sensed hyper-spectral signature to the reference hyper-spectral signature for the same portion of the iris for the plurality of different portions to generate an output that identifies the unidentified person.

12. The method of claim 11, wherein both the reference and sensed hyper-spectral signatures includes at least six non-contiguous bands.

13. The method of claim 11, wherein both the reference and sensed hyper-spectral signatures include six or more bands within the RGB color space from approximately 400 nm to 700 nm.

14. The method of claim 11, further comprising:
providing hyper-spectral signatures for a plurality of people as a training set;
providing a larger plurality of candidate bands within the RGB color space from approximately 400 nm to 700 nm; and
using the training set to down select the four or more bands from the larger plurality of candidate bands to distinguish the hyper-spectral signatures in the training set.

15. The method of claim 11, wherein said four or more bands include at least two bands within at least one of the R band, the G band or the B band.

16. The system of claim 1, wherein said four or more bands include at least two bands within at least one of the R band, the G band or the B band.

* * * * *